Figure 14:
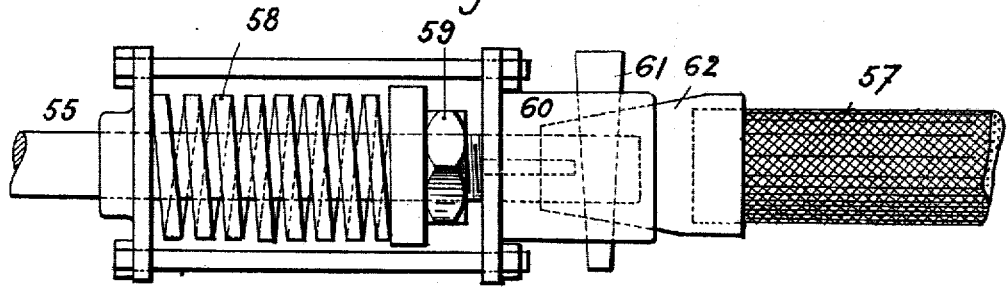

No. 825,495. PATENTED JULY 10, 1906.
R. SNYERS.
COMBINED SYSTEM OF TRANSPORT BY MONORAIL AND AUTOCAR.
APPLICATION FILED APR. 6, 1905.
5 SHEETS—SHEET 1.
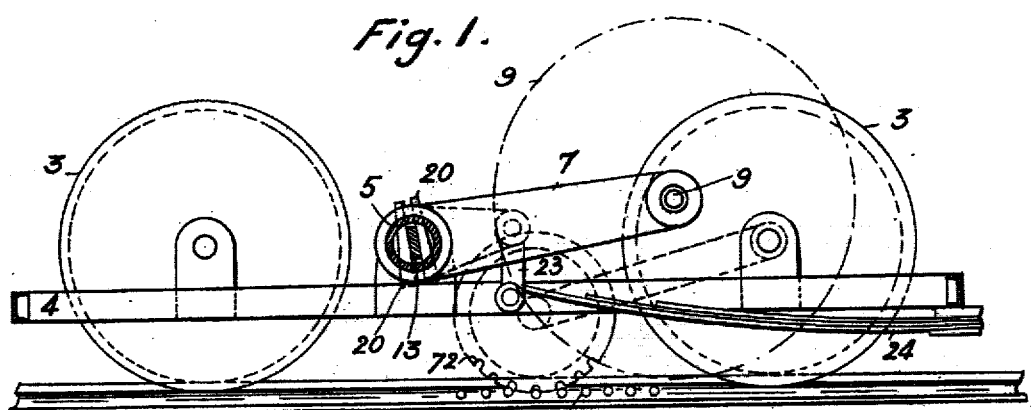
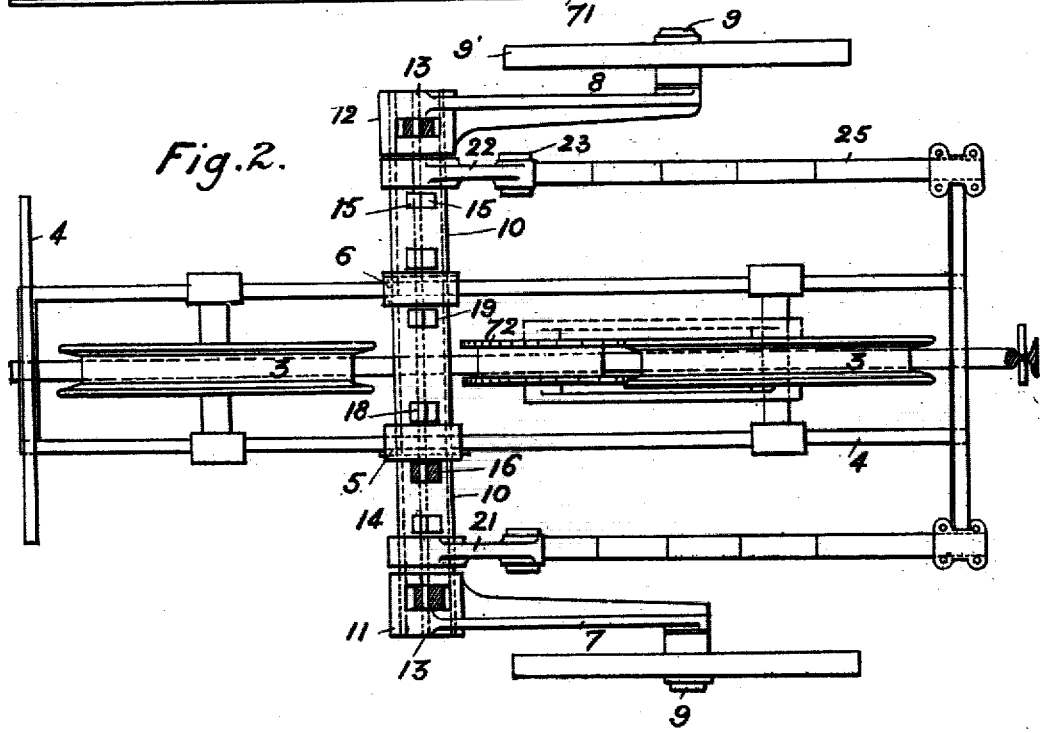
Witnesses:
Inventor:
Raymond Snyers
By
Attorney No. 825,495. PATENTED JULY 10, 1906.
R. SNYERS.
COMBINED SYSTEM OF TRANSPORT BY MONORAIL AND AUTOCAR.
APPLICATION FILED APR. 6, 1905.
5 SHEETS—SHEET 2.
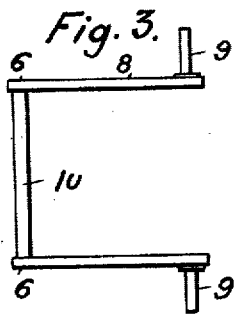
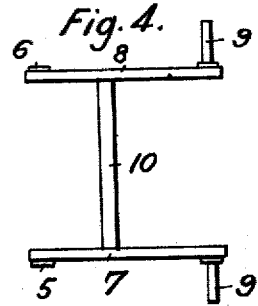
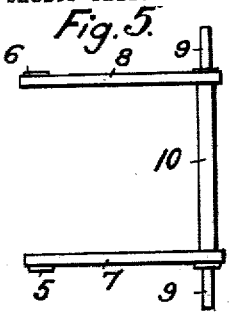
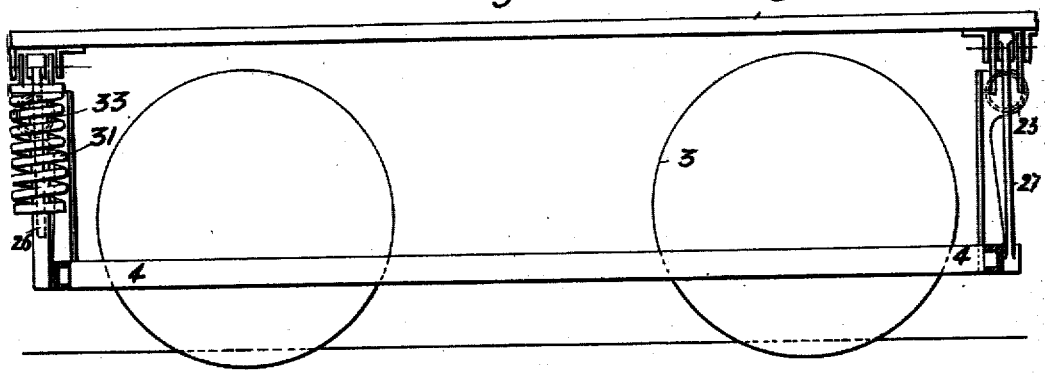
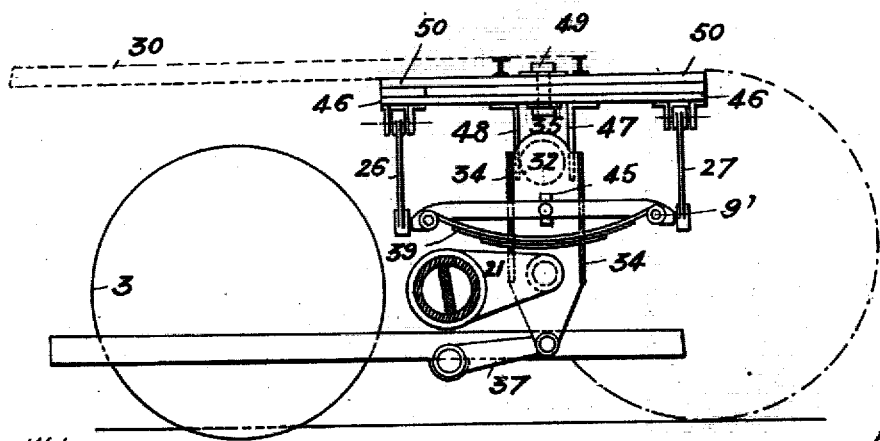
Witnesses:
Inventor:
Raymond Snyers.
Attorney.

No. 825,495. PATENTED JULY 10, 1906.
R. SNYERS.
COMBINED SYSTEM OF TRANSPORT BY MONORAIL AND AUTOCAR.
APPLICATION FILED APR. 6, 1905.
5 SHEETS—SHEET 3.
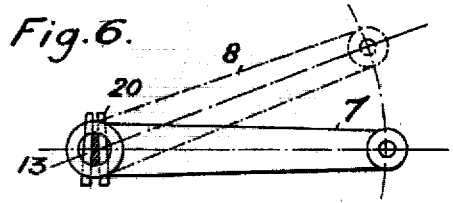
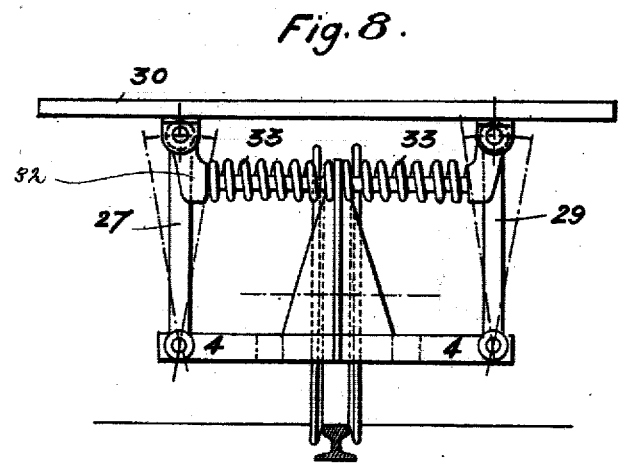
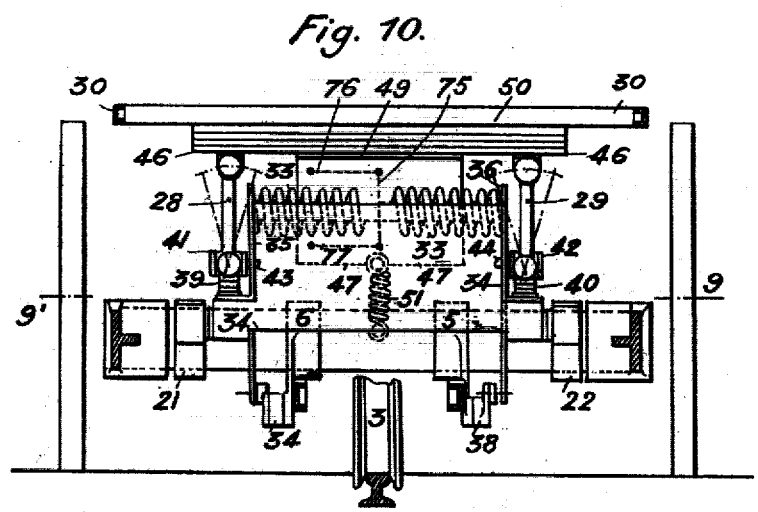
Witnesses:
Inventor.
Raymond Snyers.
By ... Attorney.

No. 825,495. PATENTED JULY 10, 1906.
R. SNYERS.
COMBINED SYSTEM OF TRANSPORT BY MONORAIL AND AUTOCAR.
APPLICATION FILED APR. 6, 1905.
5 SHEETS—SHEET 4.
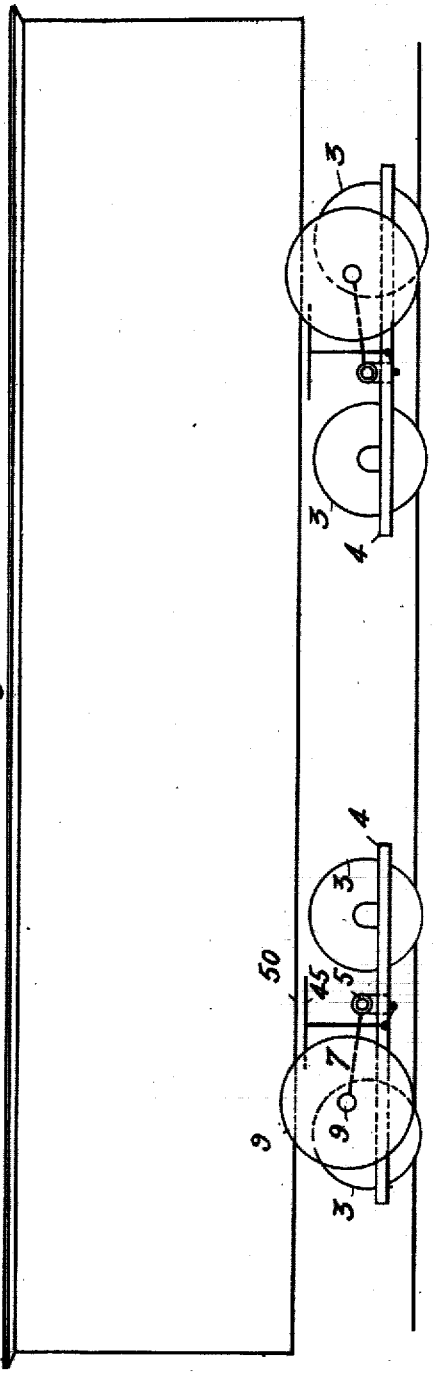
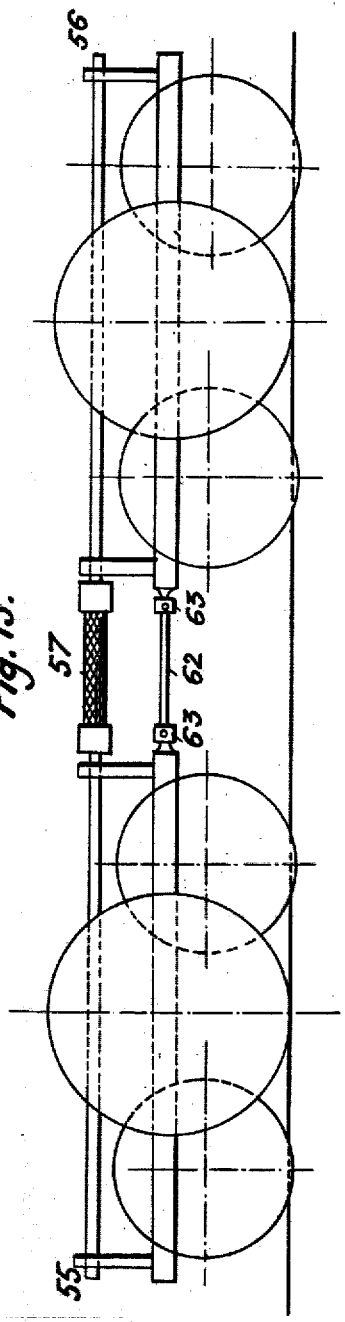
Witnesses:
Inventor
Raymond Snyers.
Attorney.

No. 825,495. PATENTED JULY 10, 1906.
R. SNYERS.
COMBINED SYSTEM OF TRANSPORT BY MONORAIL AND AUTOCAR.
APPLICATION FILED APR. 6, 1905.
5 SHEETS—SHEET 5.

Witnesses:

Inventor.
Raymond Snyers.
By ............
Attorney.

UNITED STATES PATENT OFFICE

RAYMOND SNYERS, OF BRUSSELS, BELGIUM.

COMBINED SYSTEM OF TRANSPORT BY MONORAIL AND AUTOCAR.

No. 825,495.     Specification of Letters Patent.     Patented July 10, 1906.

Application filed April 6, 1905. Serial No. 254,247.

*To all whom it may concern:*

Be it known that I, RAYMOND SNYERS, a subject of the King of Belgium, and a resident of Brussels, Belgium, have invented a certain new and useful Combined System of Transport by Monorail and Autocar, of which the following is a specification.

This invention relates to a combined system of transport by monorail and autocar for ordinary roads.

The special feature of this improved system consists in having the monorail level with the road.

The special features of the rolling-stock are:

First. The cars are supported both by wheels running on the rail and by cart-wheels running on the road; but these latter are only provided to insure lateral equilibrium.

Second. The car is constructed in such a manner that almost all the weight is supported on the rails no matter how this charge may be distributed over the frame of the carriages.

Third. The car is so constructed that the frame of the carriage is not affected by the jolting of the cart-wheels caused by the unevenness of the road on which they run.

Fourth. The motive power and the brakes are only applied to the wheels which run on the rails. Where a number of cars are attached together, the motive power may be supplied to each car by special means, causing each car to become a motor-car, although there may be only one motor at the front of the train.

Fifth. The car can be run off the rails at will, if required—that is to say, it can leave the rail and take it again, according to the necessities of the service.

Sixth. The car may be furnished with auxiliary toothed wheels to work in or gear with a rack formed on the rail to climb gradients where the ordinary friction of the wheels on the rails is insufficient to drag the load.

Figure 15:
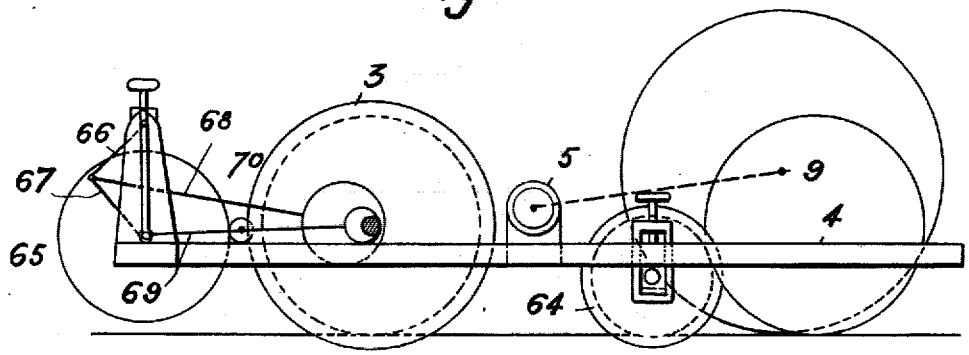
Figure 12:
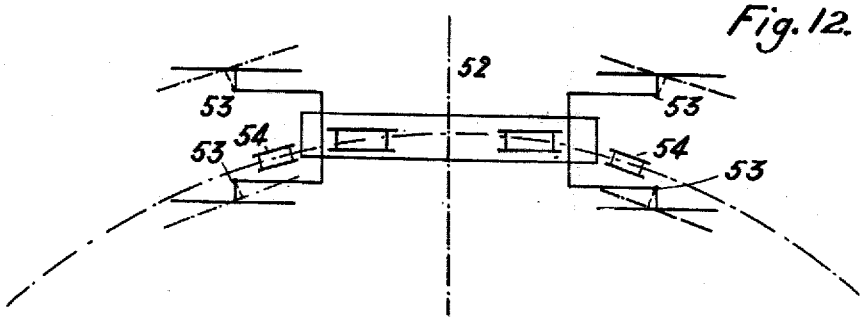

In the accompanying drawings, which show an example only, Figure 1 is a side elevation of a truck constructed according to this invention. Fig. 2 is a corresponding plan view. Figs. 3, 4, and 5 show three different forms of axles for the fore carriage. Fig. 6 is a diagrammatical view of a detail. Fig. 7 is a side elevation showing the arrangement for a car with a single truck. Fig. 8 is an end elevation corresponding to Fig. 7. Figs. 9 and 10 are similar views of a bogie-car. Fig. 11 is an elevation of a car supported on two bogies. Fig. 12 shows a diagram of a car fitted with four cart-wheels. Fig. 13 shows an elevation of the arrangement for transmitting motion from one car to another. Fig. 14 shows a detail of Fig. 13. Fig. 15 shows an arrangement for causing cars constructed according to this invention to be taken off the rails at will.

Referring to the drawings, the carriages may be mounted on one or more running-trucks. Each truck is provided with two or more wheels adapted to run on the monorail and has two cart-wheels running on the road. These two kinds of wheels are connected by a mechanical contrivance which allows the cart-wheels to yield to the unevenness of the road.

Fig. 1 is a side elevation of the carriage in position on the monorail and roadway, and Fig. 2 a top plan view thereof.

The wheels 3, running on the rails, are connected by an underframe 4, advantageously supported by springs. The frame 4 is fitted with two brackets 5 and 6, which retain a hollow vibratory shaft 10, on the ends of which are mounted two arms 7 and 8, made in one with the axle-trunnions 9 of the carriage-wheels. This part may be made in three different forms. The form shown in Fig. 3 represents a crank-axle, while Fig. 4 shows an axle cranked half-way, and Fig. 5 shows a straight axle supported in the said arms, which, however, perform the same duty.

In the first form (shown in Fig. 3) the arms 7 and 8 are not fixed on the hollow shaft 10; but, as shown in Figs. 1 and 2, they end in sleeves 11 and 12, which can revolve freely round the tubular shaft 10. The said arms 7 and 8 are engaged on the ends of a flat spring 13, subjected to torsion and disposed within the hollow shaft 10, to which latter the flat spring is fixed at least in two places.

The places where the springs are fixed vary from 14 and 15 to 16 and 17 or 18 and 19, &c., so as to permit of regulating the length of that part of the spring which is subjected to torsion, and thus adjust the same to any required degree of elasticity for the retention of the arms 7 and 8 with the axle-trunnions 9 and 10. According to the arrangement shown in Fig. 1 the spring-blade 13 is secured in the parts 10, 11, and 12 by two cotter-pins 20, which hold it strongly between them as if held in slots formed in these parts.

The holes for the passage of the cotter-pins in the hollow shaft 10 are made large enough to permit of the oscillatory movements of the arms. The object of this arrangement is to give to the axle-trunnions 9 of the two cart-wheels a certain amount of angular play in parallel planes, as indicated in Fig. 6. The lateral joltings or vibrations are thus received by the torsional spring 13 and are not felt by the frame 4. In the other two forms of arms the torsion of the spring-blade is aided by a certain amount of flexibility of the shaft 10, which is made to bend.

It is to be understood that the elasticity of the frame 9 11, 12 9, or 9 5 6 9 in the three forms shown at Figs. 3, 4, 5 and for the same purpose may be effected by other mechanical contrivances. Therefore I do not limit myself to the exact use of the aforesaid means, as all other mechanical equivalents giving the same results may be employed.

As is shown in Figs. 1 and 2, there are keyed to the hollow shaft 10 two small cranks 21 and 22, which carry, by means of links 23, two railway-springs 24 and 25, fixed to the two side beams of the frame 4. The usual means, such as the use of screws and nuts, are employed to regulate the tension of these railway-springs. They aid in adjusting the pressure of the cart-wheels upon the ground to maintain the proper equilibrium.

The truck comprises at least two wheels running on the rail and carrying an underframe, to which is attached another movable frame with the two cart-wheels, the equilibrium being maintained by two longitudinal railway-springs, as hereinbefore described.

*Suspension of the carriage-frame.*—In cars having a single truck the carriage-frame is attached direct (by the use of suitable springs) to the underframe, as shown in Figs. 7 and 8. The carriage-frame 30 rests upon the underframe 4 by means of at least four pivoted supports 26 27 28 29, which may be fitted with springs 31 and which are attached at one end to the underframe 4 and at the other end to the carriage-frame 30. This arrangement forms a kind of hinged or pin-jointed parallelopipedon which can oscillate freely in the transverse direction to the frame 4. However, the stability of the frame 30 is assured by at least two push-arms 32 with springs 33, which rest upon a bracket fixed to the frame 4, as shown in Fig. 8. By this double suspension the springs 31 help to smoothen the running of the wheels on the metals or rails and the springs 33 prevent shocks caused by the joltings of the cart-wheels. If the carriage is mounted on bogie-trucks, the above means of suspension are made to support the turning-head. In this case the said turning-head is preferably mounted on the cranks 21 and 22, fixed to the hollow shaft 10, as shown in Figs. 9 and 10. These two cranks are connected together by a cross-bar 34, journaled in the ends thereof. To the cross-bar are riveted two cheeks 35 and 36, secured in position by small guide-cranks 37 and 38, arranged parallel to the cranks 21 and 22, so that the assemblage 21 35 37 or 22 36 38 forms a pivotal parallelogram in order that during their vertical vibrations the parts 34, 35, and 36 remain parallel to themselves. Further, two springs 39 and 40 are fixed to the cross-bar 34 and carry each a bar 41 or 42, guided by a stud 43 or 44 in a slot 45, formed in said cheeks. The ends of the bars 41 and 42 are pivoted in the movable supports 26 27 28 29, and so form with the other parts and with the bars 41 and 42 a pivotal parallelopipedon adapted to swing transversely to the underframe 4 of the truck.

If desired, the said pivoted supports may be spring-controlled and made to coact with the springs 39 and 40. In any case the stability of the carriage-floor is assured by the action of the two spring-controlled push-arms 33, which rest against the cheeks 35 and 36. These push-arms are by their extremities pivoted opposite each other to a vertical rod 75, pin-pivoted to two other rods 76 and 77 in such a manner as to assure the vertical movement of the platform 50. Moreover, the said floor is guided by two angle-plates 47 and 48, which enter between the cross-bars 34. The said platform 50 is enabled to turn on the plate 46 round the pivot 49 of the bogie, the said platform carrying the carriage-frame 30. If desired, antivibration-springs may be placed beneath the frame. To the guide-plates 47 48 and the cross-bar 34 is secured a spring 51, designed to counteract the back stroke of the springs 39 and 40.

Fig. 11 gives a clear view of the general arrangement of a bogie-car provided with two trucks.

The principle carried out in the construction of the trucks and the mode of suspension adopted embody substantially the features named under numbers first, second, and third in the opening statements of the specification.

The invention further comprises the construction of the trucks or bogies with a combination of any number of railway-wheels and cart-wheels—say, for example, three, four, or more railway-wheels and four, six, or more cart-wheels. To this end the diagram Fig. 12 shows, by way of example, a truck fitted with four cart-wheels, which are a distance from the axle 52 of the truck, and therefore should have their trunnions hinged at 53, so as to enable them to set themselves in accordance with the radius of the curves when the carriage travels round small curves, and so obviate the dragging of the cart-wheels. The regulation of the wheels may be automatically effected through the intervention of a trailing roller 54, mounted on a vertical pivot at each end of the bogie-frame.

The motive power may be of any description—say, electricity, steam, vaporized fluids, &c. The motor or driving mechanism may be placed either on the bogie-frame or on the carriage-frame, although for bogie-carriages it is preferable to place the same on the bogie-frame. The driving-gear is exclusively applied to the railway-wheels in a well-known manner through the intervention of connecting-rods, toothed wheels, chains, or the like. When several carriages are coupled together, it is advantageous to provide a longitudinal shaft extending from the first carriage to the next, which while yielding sufficiently to curves of the rail and vibrations of the carriages transmits the motion to the latter. The said transmitting-gear is shown in Figs. 13 and 14 and comprises the longitudinal shafts 55 and 56 and a flexible connection or cable 57, constructed of steel wires coiled in opposite directions after the manner of a helix. The flexible connection is held taut by a tension device at each end of the shaft and comprises a compression-spring 58, regulated by a screw-nut 59 and pulling on the coupling-head 60, which latter is fixed to the shaft 55 by a hidden wedge or the like. In the coupling-head 60 is securely engaged by a key 61 the tapered end of the flexible connection or cable. The carriages are furthermore coupled together by a rigid bar 62, whose ends are pin-jointed at 63 to the frames of the adjacent carriages.

The carriage can be taken off the rail when required by the following means: As shown in Fig. 15, only the first railway-wheel 3 is provided with flanges, while the remaining railway-wheels are fitted with even rims. The latter wheels are guided over the rails by a flanged runner 64, adapted to be lifted off the rail by appropriate mechanism when it is desired to leave the track. In front of the wheel 3 is a pilot-wheel 65, having a slightly-convex rim. This pilot-wheel can be lowered by means of suitable mechanism 66, 67, 68, and 69, and so serve in raising the under-frame 4 far enough to lift the wheel 3 off the ground. This causes the whole weight of the carriage to be transferred onto the leading wheel 65 and the rear railway-wheel, while at the same time the said wheel 65 is caused to bear indirectly but strongly against the wheel 3 through the intervention of a small roller 70. Thus if the wheel 3 be the driven wheel its rotation will communicate itself by friction to the leading wheel 65, which latter then acts as the driving-wheel. The leading wheel 65 is mounted in a vertical turning bracket or fork, by reason of which it can be set at various angles for steering the vehicle. The steering mechanism for the wheel 65 is directly connected to that of the cart-wheels with hinged trunnions hereinbefore mentioned, so that the steering-gear acts simultaneously on the three wheels, and thus readily steers the vehicle.

When a rack-railroad is required for steep gradients, the monorail is utilized as a rack by providing it with lateral studs 71 at equidistant points, as shown in Figs. 1 and 2. Further, on the axle of one of the railway-wheels are pivoted two arms carrying through the intervention of other means an appropriate transmitting-gear advantageously connected with the axle of said railway-wheel. In a similar manner can the brakes be arranged directly to said wheel.

The wheel 72 can be elevated out of gear by any convenient contrivance, it being lowered onto the rail only at the required moment.

Having now described the principle underlying my invention, I would have it clearly understood that I wish to protect the various arrangements and their mechanical equivalents which embody my said invention to produce the desired result.

Having now fully described my said invention, what I claim, and desire to secure by Letters Patent, is—

1. In a device of the class described a frame, two revoluble monorail-wheels carried by the frame, a hollow shaft extending across the frame between the monorail-wheels, an arm or lever mounted upon each end of the hollow shaft, a road-wheel revolubly supported at the end of the arm or lever, and a torsion-spring secured within the hollow shaft.

2. In a device of the class described, a frame, two revoluble monorail-wheels carried by the frame, a hollow shaft vibratorily supported across the frame, a lever rigidly secured to the hollow shaft adjacent to the end thereof, a strap at the end of each lever, a strap-spring for each lever connected with the strap at one end and with the frame at the other, an arm or lever vibratorily mounted on each end of the hollow shaft, a road-wheel revolubly mounted at the free end of each lever, a flat torsion-spring located within the hollow shaft, means for adjustably securing the torsion-spring to the hollow shaft, and means for securing the torsion-spring to each of the road-wheel levers.

3. In a device of the class described, a frame, two revoluble monorail-wheels carried by the frame, a hollow shaft vibratorily supported across the frame, a lever rigidly secured to the hollow shaft adjacent to the end thereof, a strap at the end of each lever, a strap-spring for each lever connected with the strap at one end and with the frame at the other, an arm or lever vibratorily mounted on each end of the hollow shaft, a road-wheel revolubly mounted at the free end of each lever, a flat torsion-spring located within the hollow shaft, means securing the torsion-spring to the hollow shaft, and means for securing the torsion-spring to each of the road-wheel levers.

4. In a device of the class described a frame, two revoluble monorail-wheels carried by the frame, a hollow shaft extending across the frame between the monorail-wheels an arm or lever mounted upon each end of the hollow shaft, a road-wheel revolubly supported at the end of the arm or lever, a torsion-spring secured within the hollow shaft, a monorail rack-wheel, and means for bringing the same into and out of engagement with the rack of the monorail.

5. In a device of the class described, a frame, two revoluble monorail-wheels carried by the frame, a hollow shaft vibratorily supported across the frame, a lever rigidly secured to the hollow shaft adjacent to the end thereof, a strap at the end of each lever, a strap-spring for each lever connected with the strap at one end and with the frame at the other, an arm or lever vibratorily mounted on each end of the hollow shaft, a road-wheel revolubly mounted at the free end of each lever, a flat torsion-spring located within the hollow shaft, means for adjustably securing the torsion-spring to the hollow shaft, means for securing the torsion-spring to each of the road-wheel levers, a monorail rack-wheel, and means for bringing the same into and out of engagement with the rack of the monorail.

6. In a device of the class described, a frame, two revoluble monorail-wheels carried by the frame, a hollow shaft vibratorily supported across the frame, a lever rigidly secured to the hollow shaft adjacent to the end thereof, a strap at the end of each lever, a strap-spring for each lever connected with the strap at one end and with the frame at the other, an arm or lever vibratorily mounted on each end of the hollow shaft, a road-wheel revolubly mounted at the free end of each lever, a flat torsion-spring located within the hollow shaft, securing the torsion-spring to the hollow shaft, means for securing the torsion-spring to each of the road-wheel levers, a monorail rack-wheel, and means for bringing the same into and out of engagement with the rack of the monorail.

7. In a device of the class described a vibratorily-mounted hollow shaft, spring means for holding the hollow shaft against vibration under ordinary pressure, a road-wheel lever vibratorily mounted on each end of the hollow shaft, a road-wheel revolubly mounted at the free end of each road-wheel lever, and spring means preventing vibration of the road-wheel levers on the hollow shaft only under abnormal pressure.

In testimony whereof I have hereunto set my hand in presence of two witnesses.

RAYMOND SNYERS.

Witnesses:
CH. VAN VELVEN,
GREGORY PHELAN.